Figure 1:
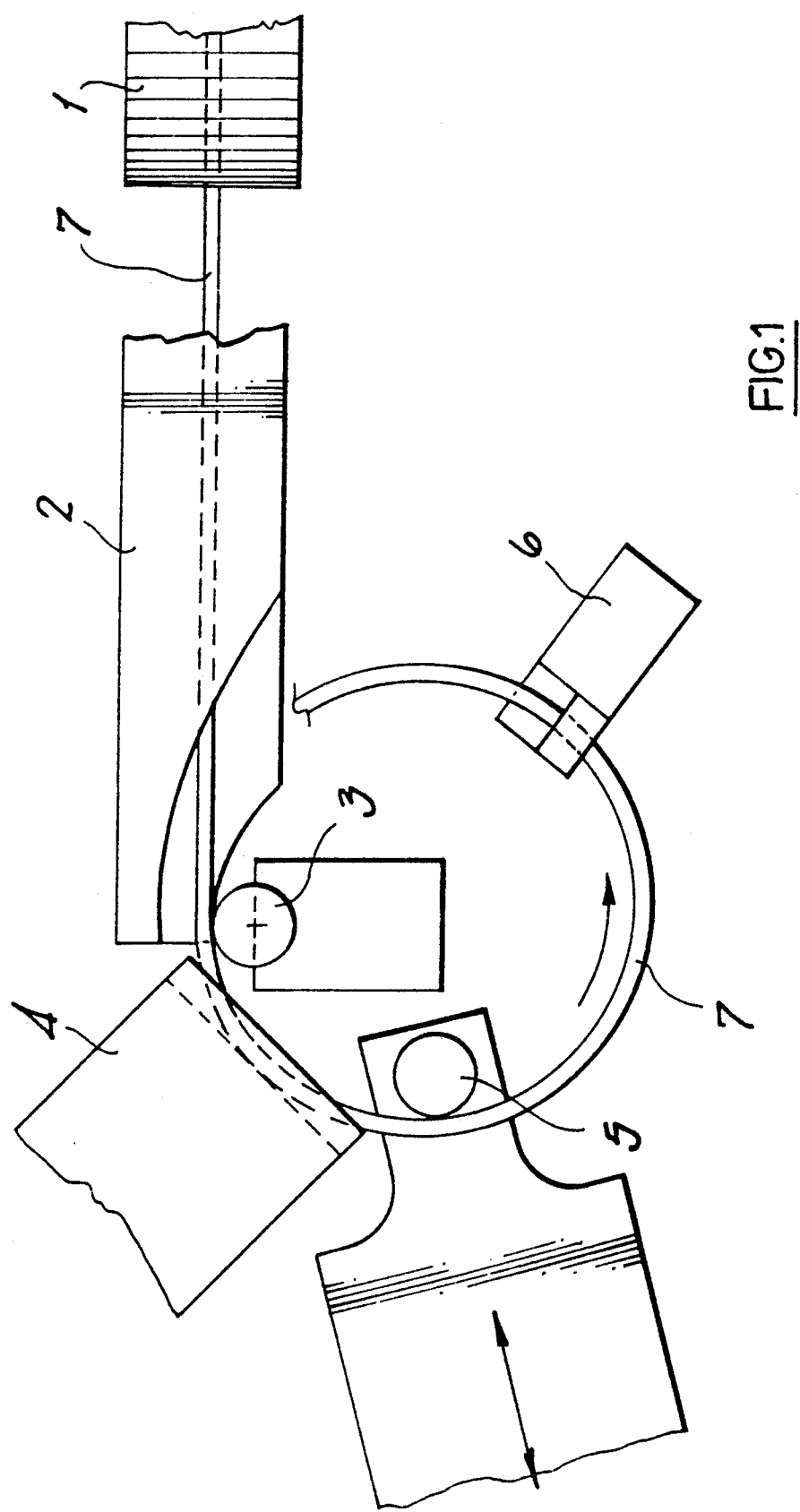

United States Patent [19]

Bruce

[11] Patent Number: 5,068,963
[45] Date of Patent: * Dec. 3, 1991

[54] PISTON RINGS

[75] Inventor: John S. Bruce, Tilton on the Hill, Great Britain

[73] Assignee: T&N plc, Great Britain

[*] Notice: The portion of the term of this patent subsequent to Jul. 3, 2007 has been disclaimed.

[21] Appl. No.: 550,208

[22] Filed: Jul. 10, 1990

Related U.S. Application Data

[63] Continuation of Ser. No. 406,282, Sep. 12, 1989, abandoned.

[30] Foreign Application Priority Data

Sep. 19, 1988 [GB] United Kingdom ............... 8821995

[51] Int. Cl.$^5$ ............................................. B23B 5/26
[52] U.S. Cl. ........................... 29/888.073; 29/888.07; 277/216; 277/217
[58] Field of Search ................... 29/888.07, 888.073, 29/156.6, 156.5 R, 156.4 R, 444; 277/216, 217

[56] References Cited

U.S. PATENT DOCUMENTS

| | | | |
|---|---|---|---|
| 2,111,574 | 3/1938 | Solenberger | 72/167 |
| 2,453,330 | 11/1948 | Marshall | 29/156.6 |
| 2,654,977 | 11/1953 | Squibb et al. | 29/156.6 |
| 2,748,453 | 6/1956 | Haldeman | 29/888.07 |
| 3,608,347 | 9/1971 | Kemminer | 29/156.6 |
| 3,757,413 | 9/1973 | Craik | 29/156.6 |
| 3,805,352 | 4/1974 | de Montremy | 277/217 |
| 4,497,102 | 2/1985 | Ikatake | 29/156.6 |
| 4,937,937 | 7/1990 | Bruce | 29/888.073 |

FOREIGN PATENT DOCUMENTS 582070 11/1946 United Kingdom ............... 29/156.6

OTHER PUBLICATIONS

Metals Handbook, Ninth Edition, vol. 4, Heat Treating, "Control of Distortion in Tool Steels", pp. 614-620 (date unknown).

Primary Examiner—William A. Cuchlinski, Jr.
Assistant Examiner—Daniel C. DePumpo
Attorney, Agent, or Firm—Nixon & Vanderhye

[57] ABSTRACT

In the manufacture of a piston ring an intermediate ring is produced by bending a metal strip first to a smaller radius of curvature than required and then bending the metal strip again to increase its radius of curvature. The first and further bends are chosen to produce an intermediate ring, whereby the intermediate ring does not change shape when subjected to stress-relaxation temperatures, and has the required shape for the piston ring.

6 Claims, 8 Drawing Sheets

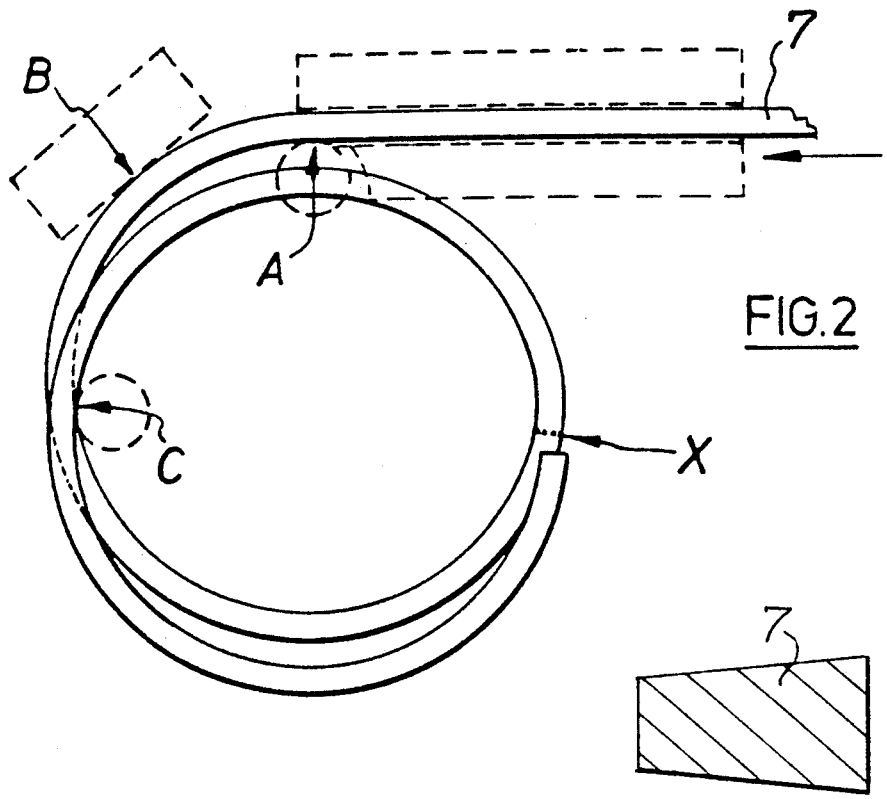
FIG.2
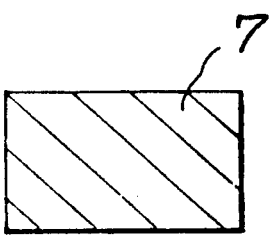
FIG.3
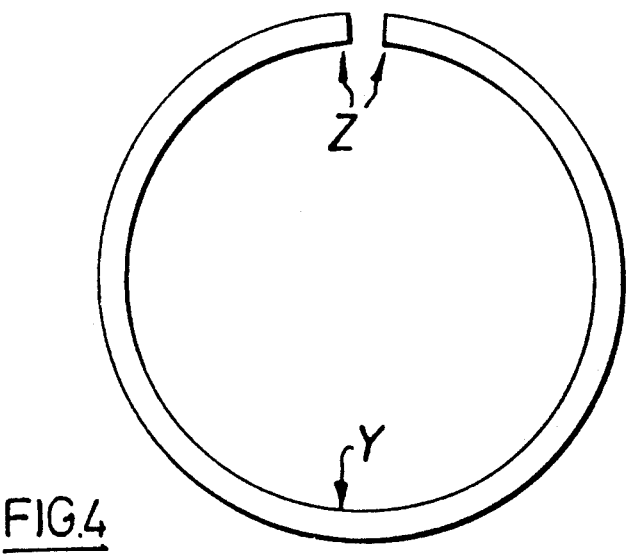
FIG.10
FIG.4

STRIP TRACKING TASK

STRIP VELOCITY SERVO

BENDING POSITION SERVO

PISTON RINGS

This is a continuation of application Ser. No. 07/406,282, filed Sep. 12, 1989, now abandoned.

This invention relates to a method for the manufacture of piston rings for internal combustion engines, and, in particular, to the manufacture of intermediate metal rings suitable for use in the manufacture of such piston rings.

Piston rings are commonly formed from metal, and have a generally circular profile but with two free ends which are adjacent one another and separated by a gap. When in use each piston ring is received in a groove provided in a piston for the internal combustion engine, where the purpose of the piston ring is to provide a seal between the piston and the interior surface of the cylinder within which the piston is to move.

The actual profile of a piston ring is not, however, perfectly circular, allowance having to be made for variation in bending moment around the circumference of the ring required to achieve an appropriate, eg uniform, radially outward pressure pattern when the ring is on a piston and fitted into a cylinder bore. For convenience, in this specification, and the accompanying claims, in relation to a piston ring, and an intermediate metal ring from which the piston ring is made, only one radius of curvature is referred to, but such references are to be considered as relating, in an appropriate manner, individually to the different radii of curvature of different constituent ring portions.

Various proposals have been made for manufacturing piston rings from metal strip by bending a length of strip into a suitable shape and then severing the ring so produced.

Thus German OLS 2 838 128 discloses the shaping of wire into rings using a deflector element (eg a roller) which may be offered up to the wire as a function of the desired outline of a piston ring. Published UK Patent Application 2 155 828A discloses a machine for producing from a metal strip piston rings of a predetermined profile for internal combustion engines.

In co-pending UK Patent Application No 8815604.7 we describe how it is advantageous to bend initially the strip to a smaller radius of curvature than is really required and then to increase the radius of curvature in a controlled manner. This method facilitates the production of rings of greater consistency and accuracy than the method disclosed in UK Patent Application No 2 155 828A in which the metal strip is not bent beyond the minimum radius of curvature required in the ring.

However, it is a disadvantage when making piston rings from metal strip that in bending the strip stresses are created in the metal which, if the metal is subsequently subjected to high temperatures such as the 450° C. to 650° C. used in the nitro-carburising process), can cause the shape of the ring to change as the stresses relax.

We have now found, however, that it is possible to alleviate this problem, when using the process described in UK Patent Application No 8815604.7, by careful choice of the relative amounts of bending carried out in the first and second bending operations in the process.

It is an object of the present invention to provide an intermediate metal ring, subsequently to form a required piston ring, and having the property that its shape and size remain substantially unchanged when, thereafter, it is subjected to heat at stress-relaxation temperatures for the metal.

Thus the present invention provides an intermediate metal ring suitable for use in the manufacture of a piston ring, said intermediate ring having a shape produced by bending a metal strip first to a smaller radius of curvature than required in said ring and then bending the metal strip again to increase its radius of curvature, to form the intermediate ring, and such that the intermediate ring has the required shape for the piston ring, whereby the initial bending of the metal strip is such that the shape and size of the intermediate ring remains substantially unchanged during subsequent heat treatment at stress-relaxation temperatures.

Surprisingly we have found that if the initial bending is not to a small enough radius, the intermediate ring produced after the second bending will decrease in diameter during nitro-carburising, which is typically carried out at 570° C. for about 3 hours. If the initial bending is to too small a radius the intermediate ring produced after the second bending will increase in diameter during nitro- carburising. However, if an initial bending is to a correct extent the intermediate ring retains its shape and size after the second bending, and during nitro-carburising.

For each size of ring, there is a band of values of radius of curvature to which the initial bending must be made for an intermediate ring in accordance with the present invention to be obtained. This band may vary according to the particular metal used and the dimensions of the strip.

The band of values may readily be determined by trial and error but will usually be found when the initial bending of the metal strip is to a radius of curvature which is between 50 and 70 per cent of the radius of curvature required for the piston ring and for the intermediate ring after the second bending.

By "stress-relaxation" temperatures we mean a temperature where residual stress in the metal will begin to relax as the metal is held at that temperature. Such temperatures are well known to those skilled in the art and are time dependant so for a typical steel an example of such a temperature would be 500° C. for 2 hours.

The intermediate rings are "intermediate" in the sense that they will usually be subjected to further treatment or treatments to convert them into finished piston rings. Such further treatments usually will include stress relaxation, possibly in combination with nitro-carburising, in which the rings are held at a temperature of 450° C. to 650° C. for several hours in an atmosphere of a mixture of nitrogenous gas and a carburising gas in order to give them a hardened surface. (This process is described in more detail in UK patent No 2 112 025B). Other treatments could include face and edge machining of the rings.

The invention thus provides also a piston ring for an internal combustion engine which has been made from an intermediate metal ring of the kind described above.

Figure 5:
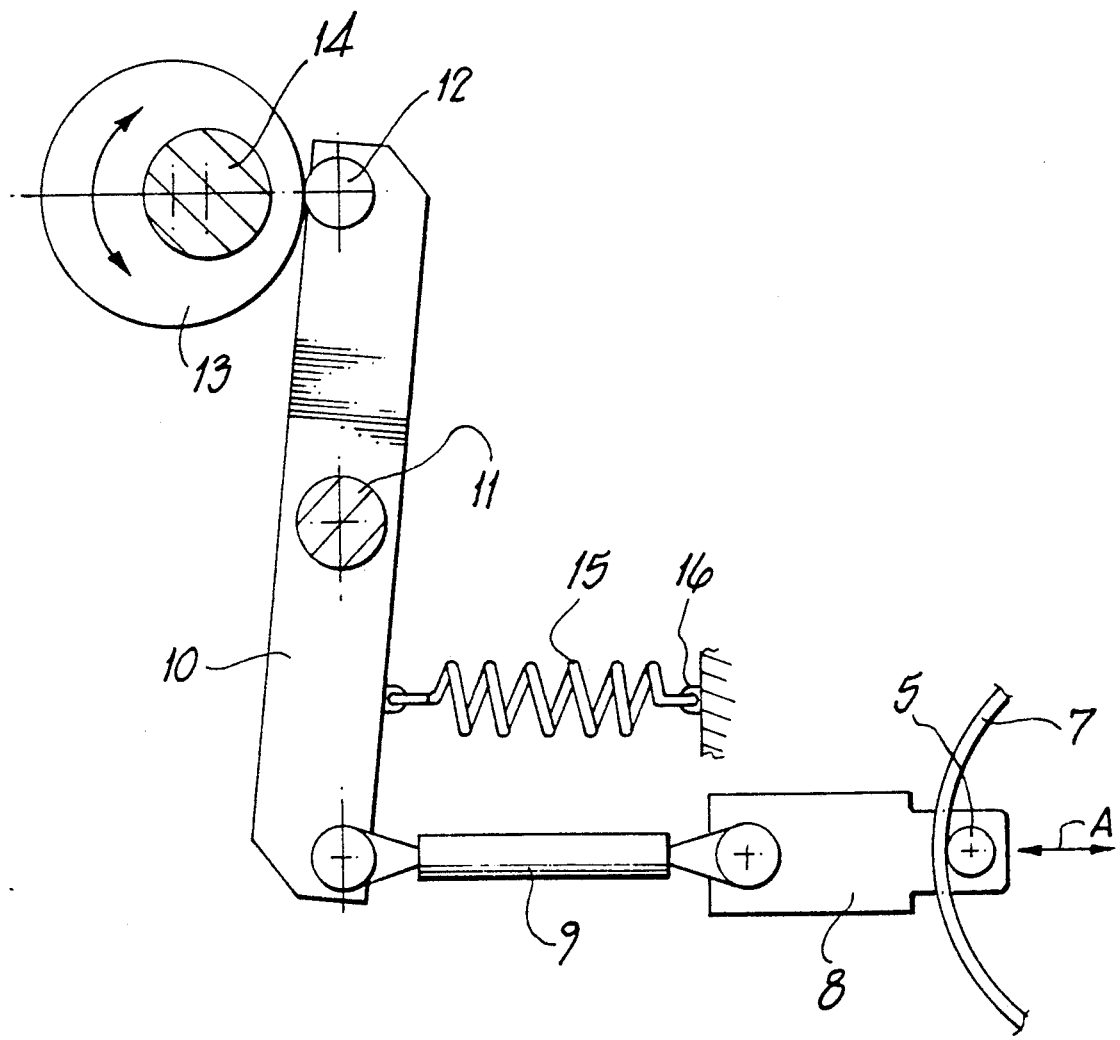
Figure 6:
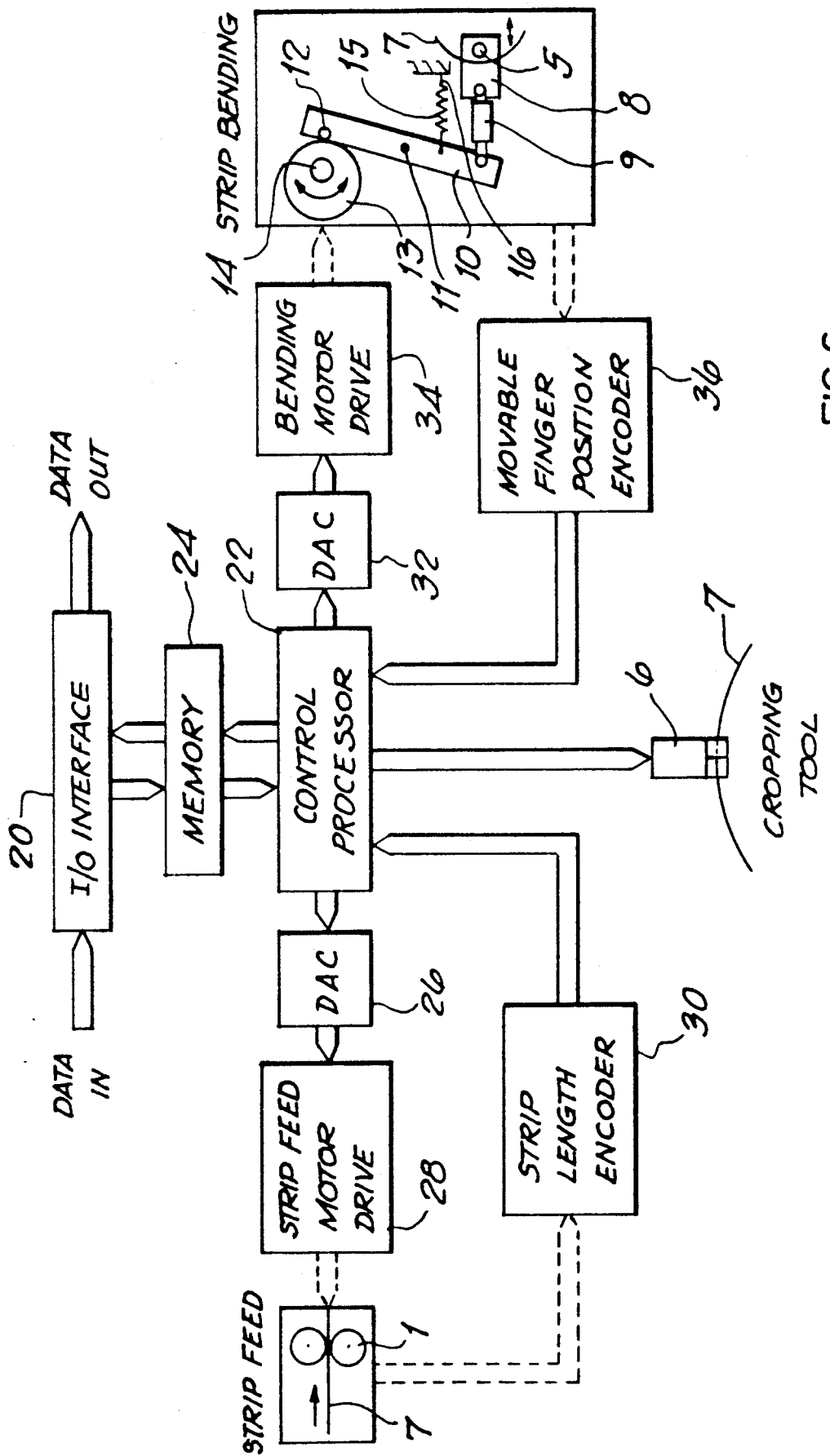
Figure 7:
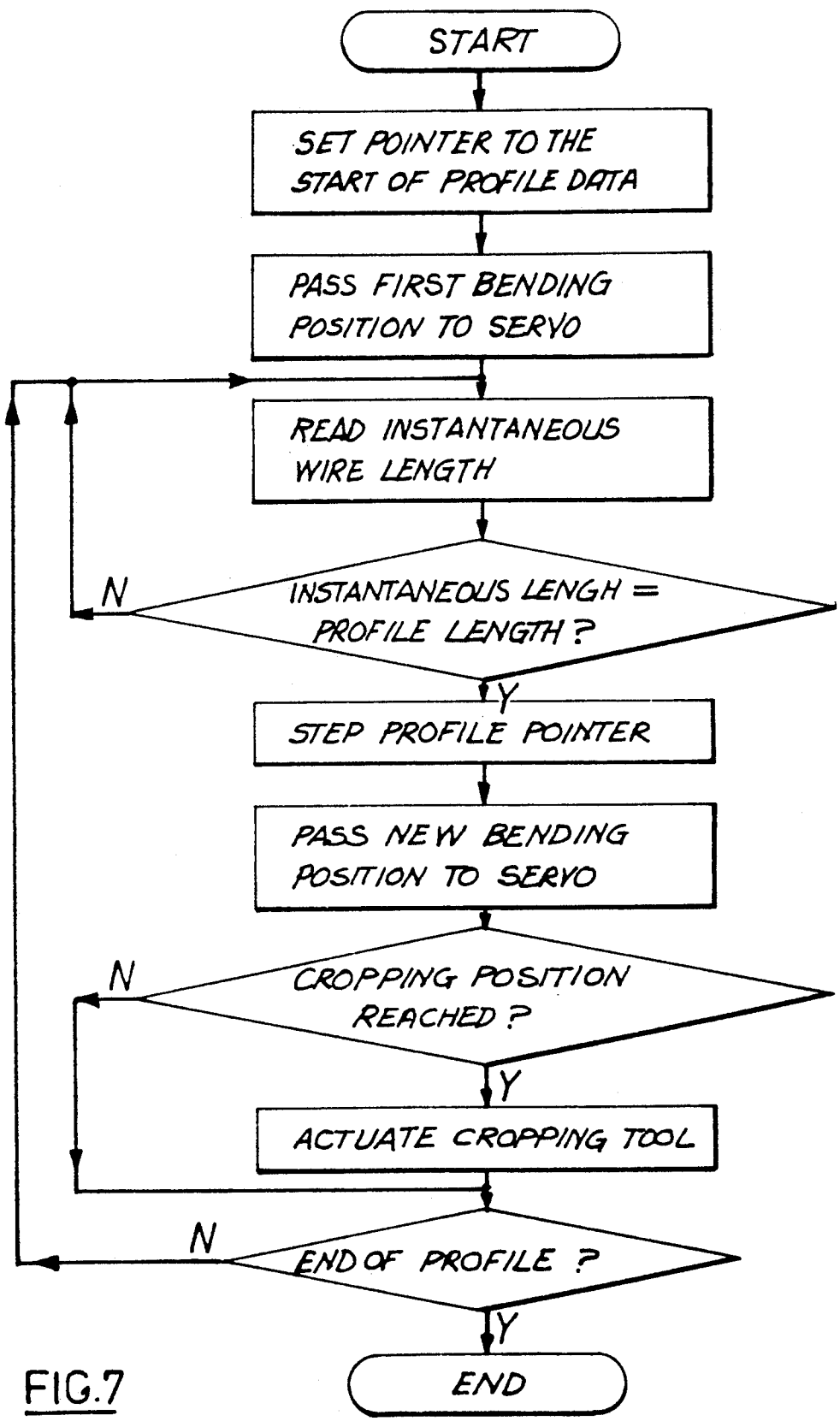
Figure 8:
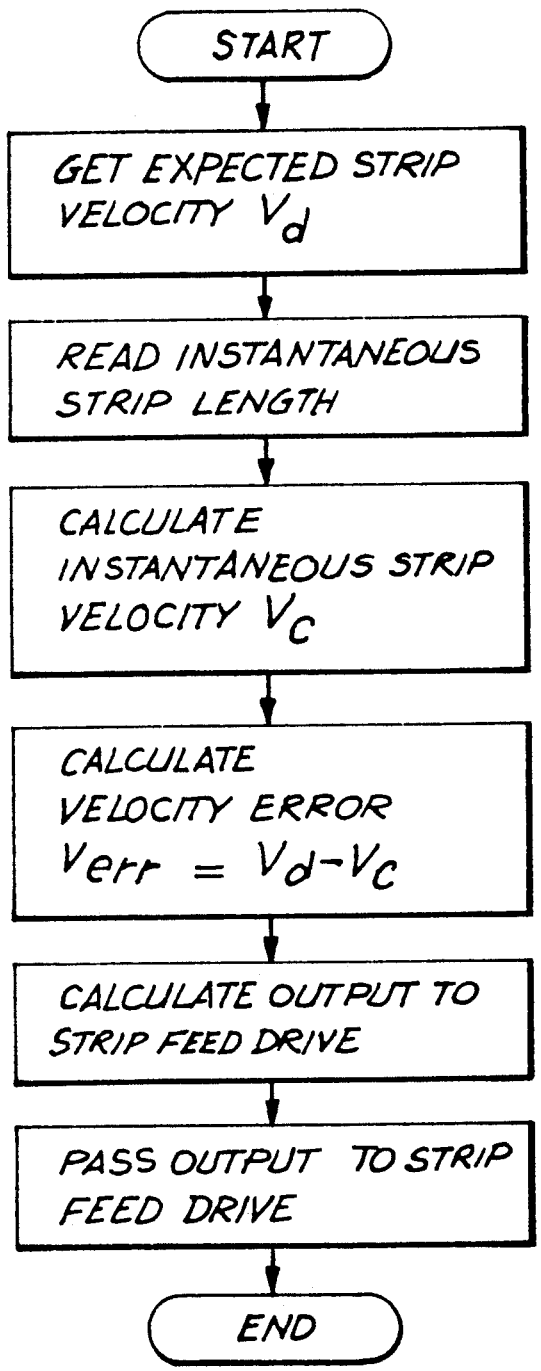
Figure 9:
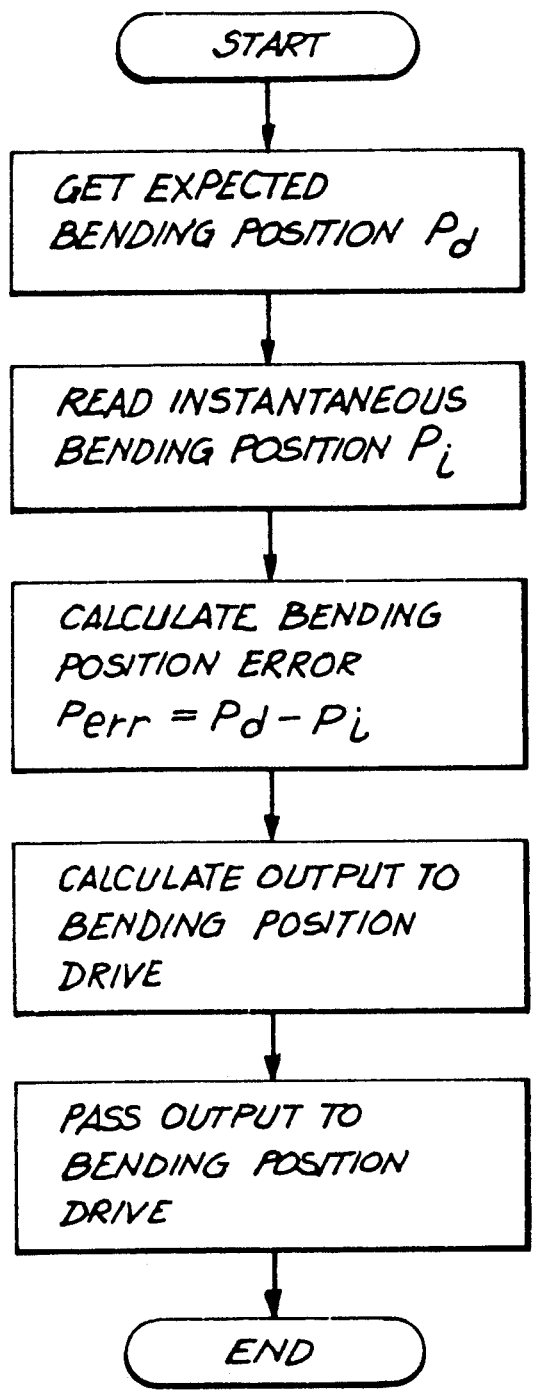
Figure 11A:
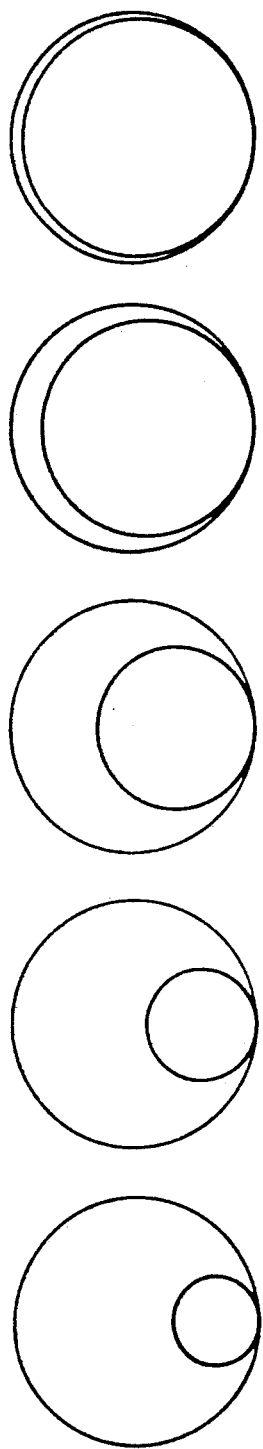
Figure 11B:
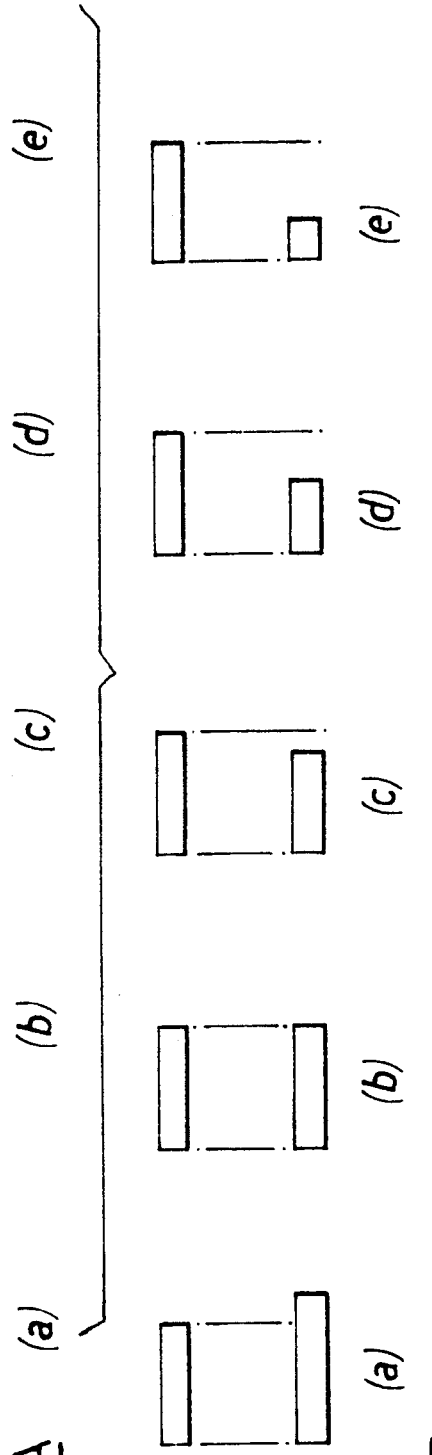
Figure 11C:
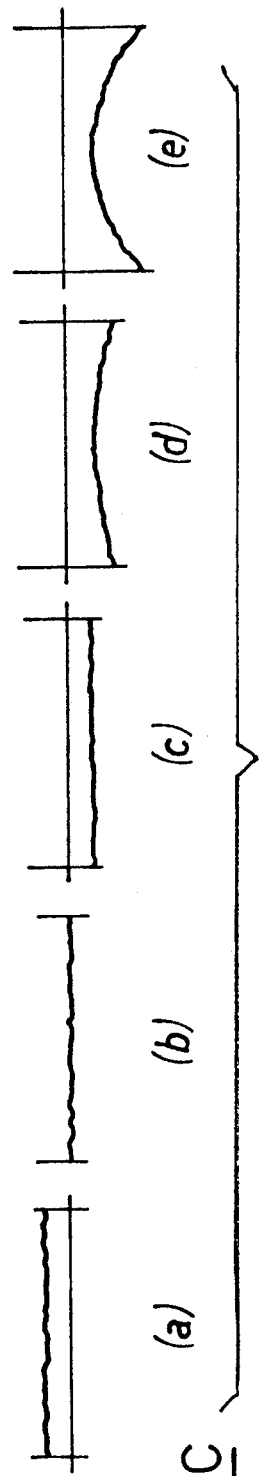

The invention will now be described in more detail, by way of example only, with reference to the accompanying drawings in which FIG. 1 is a diagram illustrating part of apparatus for bending metal strip into an intermediate ring produced after two bending operations, the intermediate metal ring being suitable for use in the manufacture of piston rings for internal combustion engines, FIG. 2 is a diagram illustrating the coiled strip produced immediately prior to severing an intermediate ring, FIG. 3 is a cross-section of the metal strip before bending, FIG. 4 is a plan view of the intermediate ring when severed, FIG. 5 is a view of constituent means of the apparatus for varying the radius of curvature of the metal strip, FIG. 6 is a block diagram of a control system for the apparatus, FIGS. 7 to 9 are flow charts for explaining the operation of the control system of FIG. 6, FIG. 10 is a cross-sectional view of the metal strip as it appears in the intermediate ring, FIG. 11A is illustrative of five different amounts of initial bending, individually, each in the formation of an intermediate ring, each intermediate ring having the same size, and FIGS. 11B and 11C relate to piston rings subsequently formed from the five intermediate rings of FIG. 11A, by nitro-carburising the intermediate rings, FIG. 11B being illustrative of how the gap widths of the five piston rings compare with an ideal value for the gap width, FIG. 11C being illustrate of how the radii of curvature varies around each piston ring, and how these radii of curvature compare with a uniform ideal value for the radius of curvature for the piston rings.

As shown in FIG. 1, an apparatus for bending metal strip consists essentially of feed rollers 1 for metal strip, a guide 2 for maintaining metal strip aligned in a straight path, a first bending means composed of a fulcrum pin 3 and an abutment 4, and a second bending means composed of a movable finger 5 arranged to co-operate with the abutment 4. A high speed cropper 6 is also provided to sever the intermediate rings produced.

In operation a metal strip 7 of rectangular cross-section as shown in FIG. 3 is pushed by means of feed rollers 1 through the guide 2 with its wider cross-sectional dimension in the plane of the diagram shown in FIG. 1.

The metal strip passes alongside the fulcrum pin 3 and is forced against the abutment 4. It will be appreciated that the abutment 4 exerts a bending force on the metal strip 7 in the plane of its wider dimension, so that the strip is bent about the fulcrum pin 3.

As previously mentioned a non-circular profile is the predetermined target shape for the intermediate rings being produced. This is settled according to the ring shape needed for the particular use envisaged.

The location of the abutment 4 in relation to the fulcrum pin 3 is chosen so that a desired uniform radius of curvature is induced in the metal strip between the fulcrum pin 3 and the abutment 4. This radius of curvature is less than the minimum radius needed in the predetermined ring profile.

The metal strip 7 thence moves from the abutment 4 to a movable finger 5 exerting a radially outward pull on the strip, throughout the formation of each ring, to increase the radii of curvature of all the constituent portions of the strip forming the intermediate ring to the values required in the predetermined profile.

The position of the movable finger 5 is computer controlled, as described below, and is varied over a range to produce the predetermined non-circular profile as a length of metal strip required to form a desired intermediate ring passes around it.

One means for changing the position of the movable finger 5 is illustrated diagrammatically in FIG. 5.

As shown in FIG. 5 the movable finger 5 is mounted on a carrier 8 which is pivotally attached via an adjustable turnbuckle 9 to a lever 10. The lever 10 is pivoted about a pin 11 and the end of the lever opposite to the turnbuckle is provided with a roller 12 which bears on an eccentric 13 rotatable about a shaft 14. In operation the eccentric 13 is rotated to any angular location by a servo-motor, and a computer is used to generate signals controlling the position of the eccentric 13 by means of the servo-motor, as described below, and at any given instant during the passage of a length of metal strip corresponding to an intermediate ring over the movable finger 5.

Angular movement of the eccentric from the position shown in FIG. 5 will cause the lever 10 to pivot about the pin 11 and thereby cause linear movement of the carrier 8 which is located in a slide (not shown) permitting linear movement only along the line of arrow A in FIG. 5. The roller 12 is maintained in contact with the eccentric 13, by a tension spring 15 between the lever 10 and a fixed point 16, assisted by the reaction force between the finger 5 and the metal strip 7.

When a ring of the predetermined profile has been produced it is necessary to sever the ring from the oncoming metal strip. In the present invention the metal strip is deflected slightly after bending is complete so that the ring being produced will overlay the oncoming strip. The deflection is into a plane adjacent that of the feed of metal strip and is achieved by deflector plates (not shown in the diagrams) to produce the result illustrated diagrammatically in FIG. 2.

FIG. 2 shows in diagrammatic form the progress of a metal strip as it is transformed from a straight strip into a ring. The strip is bent initially between points A and B to a fixed extent and then its radius of curvature is increased between B and C by varying amounts. As metal strip continues to be fed through the bending means a ring is produced which is deflected to overlay the strip being fed in. Once the complete ring has been made it must be severed, and the severing is performed in the present invention by a high speed cropper 6 (shown in FIG. 1).

The point at which the intermediate ring is severed (point X in FIG. 2) is that at which the free ends of the severed ring are at the correct position on the ring profile and have the correct separation. The usual shape of an intermediate ring is illustrated in FIG. 4 from which it can be seen that the ring has a minimum curvature (maximum radius) at position Y opposite the gap and maximum curvature (minimum radius) at position Z adjacent the gap.

Since during the second bending operation two simultaneous movements are taking place in that the metal strip 7 is moving forward and the movable finger 5 is moving radially inwardly and outwardly to vary the degree of bending on the strip, it is only possible to say that the strip assumes a given radius, for example its maximum radius, somewhere between B and C in FIG. 2. Therefore in the present invention the severance point, point X in FIG. 2 is determined experimentally for each ring profile, and each type of metal strip, since the elasticity of the metal will affect where between B and C a final radius is achieved. The determination of the severance point can be readily achieved by trial and error in each case.

It is also preferred that the severance takes place without stopping feed of the metal strip so that preferably the point of severance is located far enough away from point C to allow a slight arrest of movement of the strip, eg 35 milliseconds, to be taken up by the elasticity of the strip without disturbing the bending process.

As shown in FIG. 6, a control system for the apparatus described above comprises an input-output interface device 20 communicating with a control processor 22 via a memory 24. The control processor 22 is arrange to receive data from, and to transmit data to, the memory 24, and may comprise a type 68000 microprocessor supplied by Motorola Inc. The input-output device 20 operates in a manner compatible with the control processor 22, and, in particular is arranged to transmit data to, and receive data from, the memory 24. Further, the input-output device 20 is to receive input data IN, for example, from an operator, say, via a keyboard (not shown); and is to provide output data OUT for the operator, for example, the device 20 driving a visual display unit (not shown).

The control processor 22 provides information, via a digital-to-analogue converter (DAC)26, to control a servo-motor 28 for feeding the metal strip 7 through the apparatus. In particular, the servo-motor 28 drives the feed rollers 1. The feed rollers 1 are coupled operably to a transducer, comprising an encoder 30, the encoder providing signals to the control processor 22, each such signal being representative of the strip length having passed through the rollers.

The control processor 22 also provides information, via a DAC 32, to control a servo motor 34 for varying the position of the movable finger 5, and so to control the radius of curvature of the strip portion instantaneously at the movable finger. In particular, the servo-motor 34 causes rotation of the eccentric 13, as described above. One convenient part of the movable finger control mechanism is coupled operably to a transducer, comprising an encoder 36 providing signals each representative of the instantaneous position of the finger. The information representative of the position of the finger 5 is supplied by the encoder 36 to the control processor 22.

Stored in the memory 24 is data defining the predetermined non-circular profile of a required ring. This profile data is obtained by employing, say, known finite element analysis techniques. There are addressable locations in the memory in this respect, at each such location the appropriate profile data for a 0.1° of arc of the ring, (or for a portion of the ring subtending an angle of 0.1° at the centre of curvature of the portion), is stored. In particular, at each such location there is stored profile data comprising the radius of curvature required for the corresponding portion of the ring, and the length of the strip 7 required in forming the part of the ring upto, and including, this ring portion.

The first location has stored thereat the appropriate profile data corresponding to the leading portion of the strip 7 to form the ring.

Also stored at a CROPPING location in the memory 24, and capable of being addressed by the control processor 22, is information defining the portion of the ring being formed, comprising the appropriate 0.1° of arc of the ring, and at the movable finger 5, when the previously formed ring is to be cropped from the part of the strip 7 having passed through the bending means. As stated above, the information stored at the CROPPING location is provided as a result of experimentation when setting-up the apparatus to produce the ring, and is entered into the memory 24 via the operator's keyboard.

Also as stated above, and in relation to each ring, the encoder 30 detects the instantaneous length of the strip having passed through the feed rollers. However, the corresponding length of the strip of use in the control of the formation of the ring, and stored at each profile data location in the memory, takes into account the spacing between the two encoders 30 and 36 in the apparatus, the dimensions of relevant parts of the apparatus, and the shape of the strip as it passes between the feed rollers 1 and the movable finger 5. The control processor 22 is arranged to convert the stored strip length values to values corresponding to those detectable by the encoder 30, so that a direct comparison can be made therebetween.

This is in addition to the control processor also being arranged to covert any demanded change in the velocity of feeding of the strip, as described below, and as determined by the control processor, to a corresponding output signal, to cause the appropriate change of the drive of the servo-motor 28, and to effect the demanded change in the feeding velocity of the strip.

Similarly, the encoder 36 does not detect the instantaneous position of the movable finger 5, but a magnitude in a predetermined relationship thereto; and the position of the movable finger is in a predetermined relationship to the radius of curvature of the strip portion provided by bending the strip portion of the movable finger. The control processor 22 is arranged to convert the stored radius of curvature values to values corresponding to those detectable by the encoder 36, so that a direct comparison can be made therebetween, as described below.

This is in addition to the control processor also being arranged to convert any demanded change of the radius of curvature value, as described below, and as determined by the control processor, to a corresponding output signal, to cause the appropriate actuation of the servo-motor 34, and to effect the change in the radius of curvature.

The manner of operation of the control processor 22 partially is shown in the flow charts of FIGS. 7 to 9.

At the start of the operation of the control processor in forming the ring, and as indicated in the flow chart of FIG. 7, the data at the first location of the ring profile data in the memory 24 is addressed by the control processor.

From the reading of the value of the radius of curvature of the first ring portion, and stored at the first location of the ring profile data, the control processor obtains the expected value $P_d$ of the output of the encoder 36 corresponding to the required first position of the movable finger 5.

The operation of the control processor then enters a routine which is repeated in a repetitive manner. This part of the operation of the control processor is controlled by a clock, and each constituent routine of the operation is entered after each millisecond during the formation of the required ring. In the first 250 microseconds of each routine, and as is indicated in the flow chart of FIG. 8, a strip velocity servo loop is in operation.

In the operation of the strip velocity servo loop in the first routine, and from the reading of the value of the first strip length to pass through the feed rollers 1, and stored at the first location of the ring profile data; and because the routine is clocked to last for one millisecond; the control processor obtains the currently expected velocity of the strip feed $V_d$.

Because, initially, the strip is being fed, for example, in the manner required in the formation of the final portion of the previous ring formed by the apparatus; or otherwise; the control processor obtains the instantaneous actual strip velocity $V_c$, by immediately previously having read, and stored, two outputs of the encoder 30 with a millisecond interval therebetween, and by subtracting the first such encoder output from the second output.

Any error $V_{err}$ between the currently expected velocity $V_d$ and the instantaneous actual velocity $V_c$ is determined by the control processor; and the control processor derives the corresponding change in speed of the servo-motor 28 in order to tend to eliminate $V_{err}$. The appropriate output signal is supplied by the control processor to the servo-motor 28, via the DAC 26. This completes the operation of the strip velocity servo loop in the first routine.

Then, also within the 250 microsecond period, referred to above, a bending position servo loop is in operation in the manner indicated in the flow chart of FIG. 9. As referred to above, there has been obtained the currently expected value $P_d$ of the output of the encoder 36, corresponding to the current required position of the movable finger 5.

The control processor also reads the instantaneous actual output $P_i$ of the encoder 36, possibly. comprising the position of the encoder during the formation of the final portion of the previous ring, and read, and stored, by the control processor.

Next the control processor calculates any error $P_{err}$ between $P_d$ and $P_i$; and derives the corresponding amount of actuation of the servo-motor 34 in order to tend to eliminate $P_{err}$. The appropriate output signal is supplied by the control processor to the servo-motor 34, via the DAC 32. This completes the operation of the bending position servo loop in the first routine.

After the end of the 250 microsecond period, with the required strip feed velocity, and the required position of the movable finger 5, demanded, and within the final 750 microsecond period of the first clocked routine, the control processor performs a strip tracking task, as indicated in the flow chart of FIG. 7.

The strip tracking task comprises a sub-routine to be performed repetitively until interrupted at a predetermined point in the routine, or until it is determined that the instantaneous strip length having been fed through the feed rollers 1 is equal to the strip length value stored at the first profile data location in the memory.

At the start of the sub-routine, whilst forming the first portion of the ring, the control processor 22 reads the instantaneous output of the encoder 30, and representative of the strip length as having passed through the feed rollers 1.

The control processor 22 then decides whether, or not, the thus instantaneously detected strip length as having passed through the feed rollers is equal to the value of the strip length expected to have passed through the feed rollers, and stored at the first memory located currently being addressed. This completes the sub-routine. If the decision is negative, the output of the encoder 30 is read again; and the control processor again is required to decide whether, or not, the same criterion has been obtained. The sub-routine is repeated in a repetitive manner until the decision is affirmative; or until the repetition of the sub-routine is interrupted, as referred to above.

Then, and also within the first routine, the control processor addresses the second location of profile data within the memory 24, at which location is stored profile data relating to the second 0.1° of arc of the ring. The data relating to the required radius of curvature of the second 0.1° of arc of the ring is read by the control processor.

The control processor then decides whether, or not, the information defining the portion of the ring, comprising the appropriate 0.1° of arc of the ring, and stored at the CROPPING location within the memory 24, is the same as the information defining the second portion of the ring, and stored at the second location of the profile data within the memory.

Irrespective of whether this decision is negative, or affirmative, in the final step of the routine, the control processor decides whether, or not, the second location of the profile data within the memory is the final such location of the profile data of the ring.

If this decision is also negative, the second routine is commenced, under the control of the clock, and at the end of the one millisecond period allowed for the first routine.

In the first 250 microseconds of the second routine. the strip velocity servo loop again is operated in the manner indicated in the flow chart of FIG. 8. This time the instantaneous actual strip velocity $V_c$ is determined by using the appropriate output of the encoder 30 read, and stored in the first routine.

Then, the bending position servo loop again is operated in the manner indicated in the flow chart of FIG. 9. This time the instantaneous actual output $P_i$ of the encoder 36 is the appropriate output of the encoder 36, read, and stored, by the control processor in the first routine.

Next the sub-routine comprising the strip tracking task is performed, until the instantaneous strip length having been fed through the feed rollers is equal to the strip length value stored at the second profile data location in the memory; or until the sub-routine is interrupted, as referred to above.

The second routine is completed, including reading the profile date at the third location in the memory.

The routine is repeated, in a repetitive manner, whilst the ring is being formed with the predetermined noncircular profile in accordance with the profile data stored in the memory 24. This repetition occurs until the control processor 22 decides that the information defining a portion of the ring, and stored at the CROPPING location within the memory 24, is the same as the information defining the portion of the ring at the profile data location within the memory currently being addressed by the control processor. In response to this affirmative decision, the control processor causes the cropper 6 to be actuated. This cropping action of the previously formed ring does not interfere adversely with the formation of the ring being produced. In the same routine, inevitably, a further decision is made that the simultaneously addressed location of the profile data in the memory 24 is not the final such location.

Subsequently, the routine is continued to be repeated, in a repetitive manner; but the cropper 6 is not actuated again until after the ring being formed is completed.

The repetition of the routine of FIGS. 7 to 9 does not cease until the control processor 22 decides, in the final step of a routine, that the simultaneously addressed location of the profile data in the memory 24 is the final such location. The formation of the intermediate ring, and the operation of the control processor in forming the ring, are now complete.

Normally the control processor 22 then repeats the above operation, without interruption of the wire feed to the bending means, and in order to form a subsequent intermediate ring.

As shown in FIG. 3 the cross-section of the metal strip 7 prior to bending is generally rectangular, but after, in the intermediate ring which is severed by cropping at point X, the cross-sectional shape will have changed to a trapezoidal shape where the thickness of metal has increased on the inner side of the ring (FIG. 10).

It will be appreciated that as the metal strip is bent in the zone from A to B (FIG. 2) the metal at the outer circumference of the curve is being placed in tension and that on the minor circumference of the curve is being compressed. Plastic deformation of the metal is also taking place, but residual stresses corresponding in form to the initial stresses, will remain in the metal. As the second bending takes place in the zone from (B to C) the metal on the extreme inner circumference tends towards being placed in tension and that on the extreme outer circumference tends towards being compressed.

We find that if the correct amount of bend is inserted in the first bending, to be partially removed by the second bending, the intermediate ring obtained will not change in size and shape when subsequently heated to stress-relaxation temperatures.

To illustrate this a series of experiments were carried out using a steel strip of rectangular cross-section 2.95mm×1.3mm. A series of circular intermediate rings, of constant radius, were made using the technique illustrated in FIG. 2 and the radius of curvature required at the first bending to produce an intermediate ring of a given radius of curvature after the second bending and which intermediate ring did not change its shape when subsequently subjected to heat at stress relaxation temperatures, was determined experimentally by trial and error. The results of these trials are given below in the Table.

TABLE

| Expt. No. | $(R_F)$ Final ring radius (mm) | $(R_J)$ Radius after first bend (mm) | $(R_J/R_F)$ |
|---|---|---|---|
| 1 | 30.75 | 19.75 | 0.642 |
| 2 | 40.00 | 23.75 | 0.594 |
| 3 | 45.25 | 25.90 | 0.572 |
| 4 | 55.00 | 29.75 | 0.536 |

In each case the behaviour of these intermediate rings under heating to stress-relaxation temperatures had been determined by heating at 570° C. in a furnace for 3 hours.

It was also found that very little shape or size change took place when subjected to heat at stress-relaxation temperatures, for rings made with $R_J$ within about ± 2.5mm of the values for $R_J$ given in the table above.

It is to be noted that the figures quoted here are to be taken as examples only, and it is to be expected that the nature of the metal used, and the cross-sectional size and shape of the metal strip will be factors to be considered.

In order to illustrate how the shape of the piston ring varies with different amounts of initial bending in forming the intermediate ring, piston rings were formed from five circular intermediate rings a, b, c, d and e, each 80.0 millimeters in diameter, by nitro-carburising the intermediate rings by the process referred to above. As indicated approximately in FIG. 11A, the intermediate ring 'a' was formed by initially bending the wire strip to have a radius of curvature of 18.5 millimeters, before being caused to have the desired diameter of 80.0 millimeters by the second bending action. Intermediate rings b, c, d, and e, respectively were bent initially to have a radii of curvature of 23.75, 29.0, 34.25, and 39.5 millimeters, before being caused to have the desired diameter of 80.0 millimeters by the second bending action. After nitro-carburising the intermediate rings to form piston rings, only the ring 'b' had retained its initial size and shape. In particular, as shown in FIG. 11B, the gap width in the piston ring 'a' was too large, and the gap widths in the piston rings c, d and e were progressively too small. In addition, the radii of curvature around each piston ring, as shown in FIG. 11C, were too large for piston ring 'a' and were progressively too small for piston rings c, d and e; and for piston rings d and e, the radii of curvature varied throughout the piston ring.

It is believed that a suitable intermediate ring in accordance with the present invention has a "stress-balanced" condition, that is, in the intermediate ring the residual stress remaining after the first bending operation and its attendant plastic deformation of the metal, and which residual stresses are of the form referred to above, are counterbalanced by the stresses inserted by the second bending.

It is possible to determine the stress in a part of an intermediate ring by drilling a hole therein, to affect the strain distribution in the immediate vicinity of the hole. This change of strain is measured by gauges located adjacent to the hole, and from these measurements the stresses present in the intermediate ring are calculated. Such a method of measuring stress is described in an article by R G Bathgate and entitled "Measurement of Non-Uniform Bi-Axial Residual Stresses by the Hole Drilling Method", Strain, Volume 4, No 2, Apr. 1968, pages 20 to 29.

I claim:

1. A method of forming an intermediate metal ring adapted for use in the manufacture of a piston ring, said method comprising the steps of initially bending a metal strip to a smaller radius of curvature than required in said piston ring; and bending said metal strip again to increase its radius of curvature to form the intermediate ring, such that the intermediate ring has the required shape for the piston ring, and wherein the initial bending of the metal strip is carried out such that the shape and size of the intermediate ring is substantially unchanged when it is subjected to heat at stress relaxation temperatures.

2. A method according to claim 1 wherein after the initial bending step, the radius of curvature of the metal strip is within 2.5 mm of a desired radius of curvature for the said initial bending step.

3. The process according to claim 1 wherein the radius of curvature of the metal strip after the initial bending step is between 50 and 70% of the radius of curvature required for the piston ring.

4. A method of forming a piston ring from an intermediate metal ring comprised the steps of:
 (a) bending a metal strip initially to a smaller radius of curvature than required for the piston ring;

(b) bending the metal strip again to increase its radius of curvature to form the intermediate metal ring; and (c) subjecting the intermediate ring to heat and stress relaxation temperatures to form a piston ring, wherein the bending of the metal strip in step (a) is such that the shape and size of the intermediate metal ring is substantially unchanged when it is subjected to heat and said stress relaxation temperatures in step (c).

5. A method according to claim 4 wherein after step (a), the radius of curvature of the metal strip is within 2.5 mm of a desired radius for the metal strip after step (a).

6. The process according to claim 4 wherein the radius of curvature of the metal strip after step (a) is between 50 and 70% of the radius of curvature required for the piston ring.

* * * * *